US009067818B2

(12) United States Patent
Kumar et al.

(10) Patent No.: US 9,067,818 B2
(45) Date of Patent: Jun. 30, 2015

(54) SEALING GLASS COMPOSITION AND ARTICLE

(75) Inventors: Sundeep Kumar, Bangalore (IN); Dong-Sil Park, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 13/354,101

(22) Filed: Jan. 19, 2012

(65) Prior Publication Data

US 2013/0189568 A1 Jul. 25, 2013

(51) Int. Cl.
*H01M 2/08* (2006.01)
*C03C 3/145* (2006.01)
*C03C 4/20* (2006.01)
*C03C 8/24* (2006.01)
*C04B 37/00* (2006.01)
*H01M 10/39* (2006.01)

(52) U.S. Cl.
CPC . *C03C 3/145* (2013.01); *C03C 4/20* (2013.01); *C03C 8/24* (2013.01); *C04B 37/005* (2013.01); *H01M 10/39* (2013.01); *H01M 10/3909* (2013.01); *H01M 10/3963* (2013.01); *C04B 2237/10* (2013.01); *C04B 2237/343* (2013.01); *C04B 2237/765* (2013.01)

(58) Field of Classification Search
USPC .......................................................... 429/185
See application file for complete search history.

(56) References Cited

U.S. PATENT DOCUMENTS

| 2,090,098 A | 8/1937 | Berger et al. |
| 3,275,358 A * | 9/1966 | Shonebarger ................. 403/179 |
| 3,544,330 A | 12/1970 | Hoffman |
| 3,678,178 A * | 7/1972 | Hubbauer et al. ........ 174/152 R |
| 3,970,464 A | 7/1976 | Shell |
| 4,190,500 A | 2/1980 | Booth |
| 4,341,849 A | 7/1982 | Park et al. |
| 4,347,295 A | 8/1982 | Herczog |
| 5,015,530 A | 5/1991 | Brow et al. |
| 5,104,738 A | 4/1992 | Brow et al. |
| 5,134,044 A | 7/1992 | Megerle |
| 5,158,840 A | 10/1992 | Megerle |
| 5,320,915 A | 6/1994 | Ali et al. |
| 5,478,663 A | 12/1995 | Cipollini et al. |
| 5,693,580 A | 12/1997 | Brow et al. |

(Continued)

FOREIGN PATENT DOCUMENTS

| FR | 1336602 A | 8/1963 |
| GB | 708698 A | 5/1954 |

(Continued)

OTHER PUBLICATIONS

Diana Tauch et al; "Glass-ceramics in the system BaO/TiO2(ZrO2)/Al2O3/B2O3 and their thermal expansion"; Journal of Non-Crystalline Solids 353 (2007) 2109-2114.

(Continued)

*Primary Examiner* — Stewart Fraser
*Assistant Examiner* — Olatunji Godo
(74) *Attorney, Agent, or Firm* — Francis T. Coppa

(57) ABSTRACT

A sealing glass composition for providing a glass seal in an electrochemical cell is presented. The sealing glass composition includes boron oxide, aluminum oxide, barium oxide, and zirconium oxide, and the glass composition is substantially free of silicon oxide and titanium oxide. The electrochemical cell incorporating the glass seal is also provided.

11 Claims, 2 Drawing Sheets

(56) References Cited

U.S. PATENT DOCUMENTS

| | | |
|---|---|---|
| 8,043,986 B2 | 10/2011 | Park et al. |
| 2003/0134194 A1 | 7/2003 | Laster |
| 2010/0086846 A1* | 4/2010 | Kumar et al. ............... 429/185 |
| 2010/0119847 A1 | 5/2010 | Wu et al. |
| 2010/0120602 A1* | 5/2010 | Park et al. ....................... 501/21 |
| 2010/0178532 A1 | 7/2010 | Shapiro et al. |
| 2010/0184580 A1* | 7/2010 | Liu et al. ......................... 501/14 |
| 2011/0104570 A1 | 5/2011 | Galloway et al. |

FOREIGN PATENT DOCUMENTS

| | | |
|---|---|---|
| GB | 2048237 A | 12/1980 |
| GB | 2083943 A | 3/1982 |
| GB | 2178589 A | 2/1987 |
| JP | 11147733 A | 6/1999 |

OTHER PUBLICATIONS

Diana Tauch et al.; "Glass-ceramics with zero thermal expansion in the system BaO/Al2O3/B2O3"; Journal of Non-Crystalline Solids 351 (2005) 2294-2298.

Search Report and Written Opinion from corresponding EP Application No. 13151418.4-1354 dated Jun. 18, 2013.

* cited by examiner

SEALING GLASS COMPOSITION AND ARTICLE

FIELD OF THE INVENTION

This invention includes embodiments that relate to a sealing glass. The invention also includes embodiments that relate to an article made using the sealing glass.

BACKGROUND OF THE INVENTION

Sealing glasses may be used in sodium/sulfur or sodium/metal halide batteries to seal ceramic components together. The components can include an electrically insulating alpha-alumina collar and an ion-conductive electrolyte beta-alumina tube. The sealing glass should join ceramic components and maintain the seal by having proper wetting behavior, a similar thermal expansion property, and good strength, among other requirements. During sealing, ionic interdiffusion between the glass and the ceramic components can occur, leading to undesirable effects, such as an increase in cell resistance, and devitrification of the glass, which can cause a change in the thermal expansion property of the sealing glass, and contribute to seal failure.

A sealing glass should withstand high temperatures and corrosive environments. During operation of the battery, the sealing glass may come into contact with molten or gaseous sodium or halides of various compositions, such as tetrachloroaluminate, which can corrode the glass and break down the seal. Most of the sealing glasses may not be capable of resisting sodium and halide exposure at operating temperatures, and may therefore corrode. In general, currently available sealing glasses may not meet the complex set of requirements necessary in a sodium battery operated at 300 to 400 degrees Celsius, for an extended period of time, which can be as long as 20 years.

With these considerations in mind, it may be desirable to identify a new sealing glass composition that has properties and characteristics that beneficially differ from some of the materials that are currently available.

BRIEF DESCRIPTION OF THE INVENTION

Various embodiments of the present invention may provide sealing glasses that are able to withstand corrosive environments.

In one embodiment, a sealing glass composition is disclosed, including boron oxide, aluminum oxide, barium oxide, and zirconium oxide. The composition is substantially free of silicon oxide and titanium oxide. In one embodiment, a sealing glass composition consists essentially of boron oxide, aluminum oxide, barium oxide, and zirconium oxide.

In one embodiment, an electrochemical cell incorporating the sealing glass composition is disclosed. The sealing glass has good sodium and halide resistance at operating temperatures, as well as complimentary mechanical properties, stability at high temperatures, and thermal expansion properties relative to ceramic components. In one embodiment, an energy storage device is also disclosed.

BRIEF DESCRIPTION OF DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
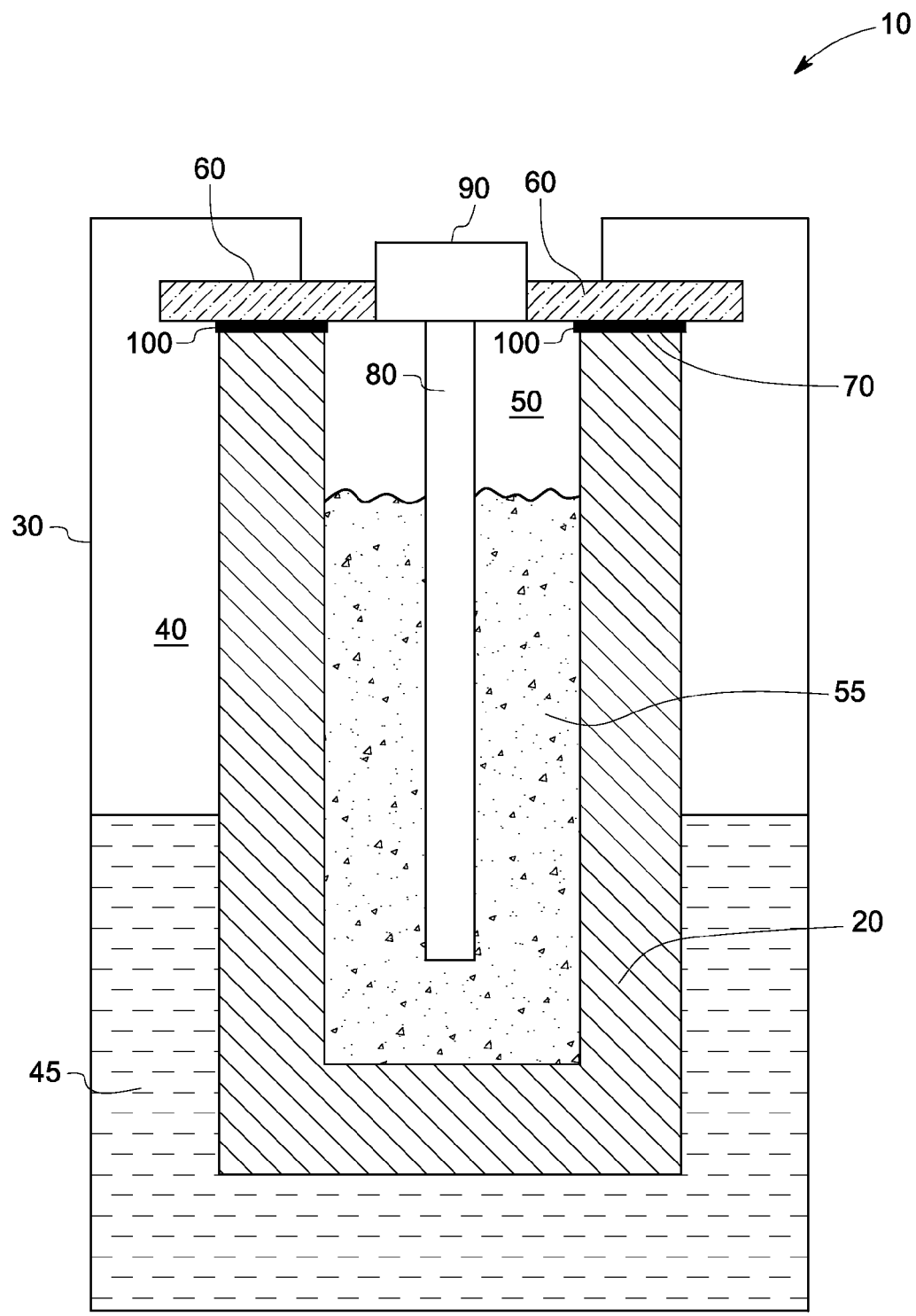
FIG. 1 is a schematic diagram depicting an electrochemical cell, according to an embodiment.

The present invention includes embodiments that relate to a sealing glass composition for a sodium battery. The invention also includes embodiments that relate to an electrochemical cell made using the sealing glass composition. The sealing glass composition includes oxides of aluminum, barium, zirconium and boron, and is substantially free of silicon oxide and titanium oxide. The sealing glass composition exhibits substantially no corrosion to sodium, and in some cases, can significantly minimize halide corrosion, or maintain halide corrosion at an acceptable level.

As used herein, "sealing glass composition" or "sealing glass", or "glass composition", refers to a composition that can seal, and is glassy (glass-like). "Sealing" is a function performed by a structure that joins other structures together, to reduce or prevent leakage through the joint between the other structures. The seal structure may also be referred to as a "seal". "Glassy" refers to a vitreous solid, or an inorganic product of fusion that has been cooled to a rigid condition without any crystallization (i.e., is amorphous to some determined extent). As used herein, the term "glass seal" refers to a seal structure formed of a sealing glass composition.

As used herein, glass-transition temperature ($T_g$) refers to a temperature at which a sealing glass is transformed from a hard and relatively brittle amorphous state, into a molten or viscous state. The term "working temperature', as used herein, refers to a temperature at which a sealing glass is delivered to be worked on, for example, to form a seal. The working temperature (also referred to as working point) of a glass is often defined by a characteristic viscosity of $10^4$ Poise. Generally, the sealing glass, at its working temperature, melts and forms a seal between two components to be joined. The glass transition temperature $T_g$ is always lower than the working temperature of the sealing glass.

A sealing glass composition, typically, includes boron oxide ($B_2O_3$) and/or silicon oxide ($SiO_2$). However, $B_2O_3$-rich glasses can corrode in a halide environment, and $SiO_2$-rich glasses can corrode in a sodium environment. Currently known sealing glasses are often made of $B_2O_3$ and $SiO_2$, and hence are prone to both sodium and halide corrosion.

Embodiments of the present invention provide a sealing glass composition that has high resistance to sodium and halide corrosion. The sealing glass composition includes boron oxide, aluminum oxide, barium oxide, and zirconium oxide. Each of the components of the sealing glass contributes to at least one property of the sealing glass, such as thermal expansion, working temperature, and corrosion resistance. Some of the properties are described below.

Boron oxide is a glass former, and provides a matrix for the sealing glass. The presence of boron oxide may influence the working temperature of the sealing glass composition. Controlling the amount of boron oxide in the glass composition provides control over the thermal expansion properties, and, in combination with aluminum oxide, can affect or improve the halide resistance of the sealing glass. In some embodiments of this invention, a suitable range for the amount of boron oxide is less than about 50 weight percent, based on the total weight of the sealing glass. In some embodiments, boron oxide is present from about 10 weight percent to about 50 weight percent, based on the total weight of the sealing glass. In some embodiments, boron oxide is present from about 20 weight percent to about 40 weight percent, and in some specific embodiments, from about 30 weight percent to about 40 weight percent, based on the total weight of the sealing glass.

Control over the amount of aluminum oxide can influence the mechanical stability and resistance to sodium and halide corrosion of the sealing glass. In some embodiments, aluminum oxide is present from about 10 weight percent to about 50 weight percent, based on the total weight of the sealing glass. In some embodiments, aluminum oxide is present from about 15 weight percent to about 35 weight percent, based on the total weight of the sealing glass. In some specific embodiments, aluminum oxide is present in a range of from about 20 weight percent to about 30 weight percent, based on the total weight of the sealing glass.

The presence and amount of zirconium oxide can influence the halide resistance of the sealing glass, by forming a zirconium hydroxide layer. The layer may function as a barrier to diffusion of any ionic species, which is believed to control the early stages of sealing glass degradation. Zirconium oxide may be present as zirconium oxide or some variant thereof, such as yttria-stabilized zirconium oxide. Zirconium oxide is present in an amount suitable for improving the halide resistance of the sealing glass composition. In some embodiments, zirconium oxide is present in an amount in a range of from about 1 weight percent to about 30 weight percent, based on the total weight of the sealing glass. In some embodiments, zirconium oxide is present in an amount in a range of from about 5 weight percent to about 20 weight percent, and in some specific embodiments, from about 7 weight percent to about 15 weight percent, based on the total weight of the sealing glass.

The sealing glass further includes an alkali earth oxide i.e. barium oxide. The presence and amount of the alkali earth oxide can control the working temperature and thermal expansion properties. A suitable amount of barium oxide may be less than about 40 weight percent, based on the total weight of the sealing glass. In some embodiments, barium oxide is present in an amount in a range from about 10 weight percent to about 40 weight percent, and in some specific embodiments, from about 20 weight percent to about 35 weight percent, based on the total weight of the sealing glass.

In addition to barium oxide, the sealing glass composition may further include up to about 20 weight percent of an additional alkali earth oxide, based on the total weight of the sealing glass. In one embodiment, the additional alkali earth oxide can include, but is not limited to, calcium oxide, and strontium oxide. In some embodiments, the sealing glass includes up to about 15 weight percent of the additional alkali earth oxide, based on the total weight of the sealing glass. A suitable range is often from about 1 weight percent to about 10 weight percent. In some specific embodiments, the sealing glass includes up to about 10 weight percent strontium oxide, based on the total weight of the sealing glass. In other specific embodiments, the sealing glass includes up to about 10 weight percent calcium oxide, based on the total weight of the sealing glass. The presence of calcium oxide can provide some advantages in certain instances, However, in other embodiments, it is preferable that the sealing glass contain only a small amount of calcium oxide (e.g., less than about 1 weight percent), or is completely free of calcium oxide. Calcium oxide may sometimes diffuse through a ceramic separator (e.g., beta-alumina) of an electrochemical cell, and can be detrimental to cell performance.

The sealing glass composition may further include sodium oxide. Sodium oxide content can beneficially influence the resistance to sodium corrosion, the working temperature of the glass, and the thermal expansion properties of the glass. In some embodiments, sodium oxide is present from about 5 weight percent to about 20 weight percent, based on the total weight of the sealing glass. In some other embodiments, sodium oxide is present from about 9 weight percent to about 16 weight percent, based on the total weight of the sealing glass.

The sealing glass composition may further include a rare earth oxide. In some embodiments, the glass composition includes up to about 10 weight percent yttrium oxide, based on the total weight of the sealing glass. In some embodiments, yttrium oxide is present from about 1 weight percent to about 8 weight percent, based on the total weight of the sealing glass.

According to embodiments of the present invention, the glass composition is substantially free of silicon oxide. Silicon oxide (also referred to as "silica" or "silicon dioxide") is a glass former, and can form a matrix for the sealing glass, if present in a sufficient amount. However, in a sodium battery, the presence and amount of silicon dioxide can cause or accelerate sodium corrosion. Silicon oxide or silicon dioxide, if exposed to sodium, may react with the sodium, and may undesirably form crystalline sodium metasilicate, and silicon. In addition, sodium which diffuses into the sealing glass may be present in an ionic state, which may adversely affect the critical properties of the sealing glass and, in turn, may lead to failure of the sealing.

As used herein "substantially free of silicon oxide" should be understood to mean that the glass composition may comprise no silicon oxide, or very small amounts of silicon oxide, for example, at impurity levels. These impurities may often be introduced by certain raw materials. In some embodiments, the glass composition may contain less than about 1 weight percent silicon oxide, and preferably less than about 0.5 weight percent. In some especially preferred embodiments, the glass composition does not contain silicon oxide in amounts that can be detected by analysis techniques commonly used in the field of material detection.

Furthermore, in preferred embodiments, the sealing glass composition is substantially free of titanium oxide. Titanium oxide may also be referred to as titanium dioxide. As used herein, "substantially free of titanium oxide" means that the glass composition does not contain titanium oxide, or may comprise only small amounts of titanium oxide, e.g. as impurities. A sealing glass composition containing titanium oxide may exhibit some degree of degradation in a sodium battery, due to corrosion from the halide (e.g. $NaAlCl_4$), leading to a decrease in battery performance. In some embodiments, the glass composition may contain less than about 0.5 weight percent titanium oxide, and preferably less than about 0.1 weight percent, and more preferably, does not contain titanium oxide at any level detectable by conventional analysis.

The sealing glass may have a thermal expansion property that makes it compatible with ceramic components to be sealed in a sodium sulfur or sodium metal halide battery. In one embodiment, the sealing glass composition has a coefficient of thermal expansion from about 5.0 ppm/° C. to about 8.0 ppm/° C., in a temperature range from about 275 degrees Celsius to about 600 degrees Celsius. In a particular embodiment, the sealing glass composition has a coefficient of thermal expansion from about 5.5 ppm/° C. to about 7.5 ppm/° C. In one specific embodiment, the sealing glass composition has a coefficient of thermal expansion in the range of from about 5.0 ppm/° C. to about 5.5 ppm/° C. In another specific embodiment, the sealing glass composition may have a coefficient of thermal expansion of from about 7.5 ppm/° C. to about 8 ppm/° C.

In one embodiment, the sealing glass composition includes from about 30 weight percent to about 45 weight percent boron oxide, from about 20 weight percent to about 30 weight percent aluminum oxide, from about 20 weight percent to about 40 weight percent barium oxide, and from about 5 weight percent to about 15 weight percent zirconium oxide. (Each percentage is based on the weight of the entire glass composition). The sealing glass composition is substantially free of silicon oxide and titanium oxide.

In one embodiment, the sealing glass consists essentially of from about 10 weight percent to about 50 weight percent boron oxide, from about 10 weight percent to about 50 weight percent aluminum oxide, from about 10 weight percent to about 40 weight percent barium oxide, and from about 5 weight percent to about 20 weight percent zirconium oxide.

The sealing glass composition may be produced by mixing the constituent oxides (or precursors thereof), and then melting the oxides to form a homogenous composition. For example, a mixture of boron oxide, aluminum oxide, barium oxide, and zirconium oxide is prepared by blending the constituent oxides in appropriate amounts. At least one additional oxide, e.g. calcium oxide, strontium oxide, sodium oxide, yttrium oxide, or a combination thereof, may further be added. The oxides and amounts thereof are described above. The sealing glass is substantially free of silicon oxide and titanium oxide, as discussed above.

In one embodiment, a homogenous glass composition, including boron oxide, aluminum oxide, barium oxide and optionally, additional alkali earth oxides, may be prepared, and zirconium oxide powder may be mixed with the homogeneous glass to form a glass-zirconium oxide powder composite. The zirconium oxide powder may be zirconium oxide, yttria-stabilized zirconium oxide, or a mixture of zirconium oxide with another ceramic powder, such as alpha-alumina.

In the general preparation of the glass composition, the mixture may be melted, and the molten glass composition is then cooled to prepare a homogeneous composition. The temperature for melting the mixture may be in a range of from about 1300 degrees Celsius to about 1700 degrees Celsius. In one embodiment, the molten glass is cooled at room temperature. In another embodiment, the mixture may be melt-quenched to form the sealing glass. The molten glass composition can be quenched between stainless steel plates at room temperature. In one embodiment, the cooled glass may be crushed into particles having predetermined particle sizes, to form frit glass powder. The glass powder, or a slurry of the glass powder, may be applied on the ceramic components, to form a seal. In some instances, about 10 weight percent to about 30 weight percent of alumina may be added with the glass powder to form the seal.

The molten glass composition may be poured into a mold to form a desired shape, such as a block, and cooled to room temperature to provide a molded sealing glass. In one embodiment, the materials are pre-mixed as powders, and are formed into a seal structure, in situ, in contact with the ceramic components to be sealed.

Some embodiments provide an electrochemical cell that incorporates a sealing glass composition. The cell may be a sodium-sulfur cell or a sodium-metal halide cell. As described previously, the sealing glass composition includes boron oxide, aluminum oxide, barium oxide, and zirconium oxide, and is substantially free of silicon oxide and titanium oxide. At least one additional oxide, such as strontium oxide, sodium oxide and/or yttrium oxide, may further be added. The oxides and their respective amounts are described above.

The sealing glasses generally have good stability and chemical resistance within determined parameters at a determined operating temperature. In some instances, optimum performance of the cell is generally obtained at a temperature greater than about 300 degrees Celsius. In one embodiment, the operating temperature may be in a range from about 270 degrees Celsius to about 450 degrees Celsius. It is desirable that the sealing glass has a working temperature below the melting temperatures of the ceramic components to be joined, and above the operating temperature of an electrochemical cell or battery. In one embodiment, the sealing glass has a working temperature of at least about 500 degrees Celsius. In some other embodiments, the working temperature is in a range of from about 700 degrees Celsius to about 1200 degrees Celsius, and in some specific embodiments, from about 800 degrees Celsius to about 1000 degrees Celsius.

In one embodiment, the sealing glass has a glass transition temperature of at least about 500 degrees Celsius. In another embodiment, the glass transition temperature is in a range of from about 500 degrees Celsius to about 700 degrees Celsius. In various other embodiments, the glass transition temperature is in a range of from about 550 degrees Celsius to about 680 degrees Celsius, and in some specific embodiments, from about 590 degrees Celsius to about 650 degrees Celsius.

The sealing glass composition can provide a glass seal to join a first component to a second component of an electrochemical cell. In one embodiment, the first component is an ion-conductive separator, and the second component is an electrically insulating collar. The separator may include an ion-conductive material, such as beta-alumina, that is also referred to as beta alumina solid electrolyte, i.e., BASE. The collar includes an electrically insulating material, such as alpha-alumina.

For example, sodium-sulfur or sodium-metal halide cells may contain the sealing glass composition that forms a glass seal to join ceramic-to-ceramic. The glass seal secures an alpha-alumina collar and a BASE separator. In one embodiment, the separator is tubular or cylindrical in shape. In another embodiment, the separator may have a different shape, such as a plate or a cone.

FIG. 1 is a schematic diagram depicting an exemplary embodiment of a sodium-metal halide battery cell 10. The cell 10 has an ion-conductive separator tube 20 disposed in a cell case 30. The separator tube 20 is made of β-alumina or β"-alumina. The tube 20 defines an anodic chamber 40 between the cell case 30 and the tube 20, and a cathodic chamber 50, inside the tube 30. The anodic chamber 40 is filled with an anode material 45, e.g. sodium. The cathodic chamber 50 contains a cathode material 55 (e.g. nickel and sodium chloride) and a molten electrolyte, usually sodium-chloroaluminate ($NaAlCl_4$). An insulative ceramic collar 60, which may be made of alpha-alumina, is situated at a top end 70 of the tube 20. A cathode current collector assembly 80 is disposed in the cathode chamber 50 with a cap structure 90 arranged between the ceramic collar 60, in the top region of the cell. The ceramic collar 60 is joined to the top end 70 of the beta alumina (BASE) tube 20 by means of a glass seal 100. The glass seal 100 is provided by the sealing glass composition described above.

Figure 2:
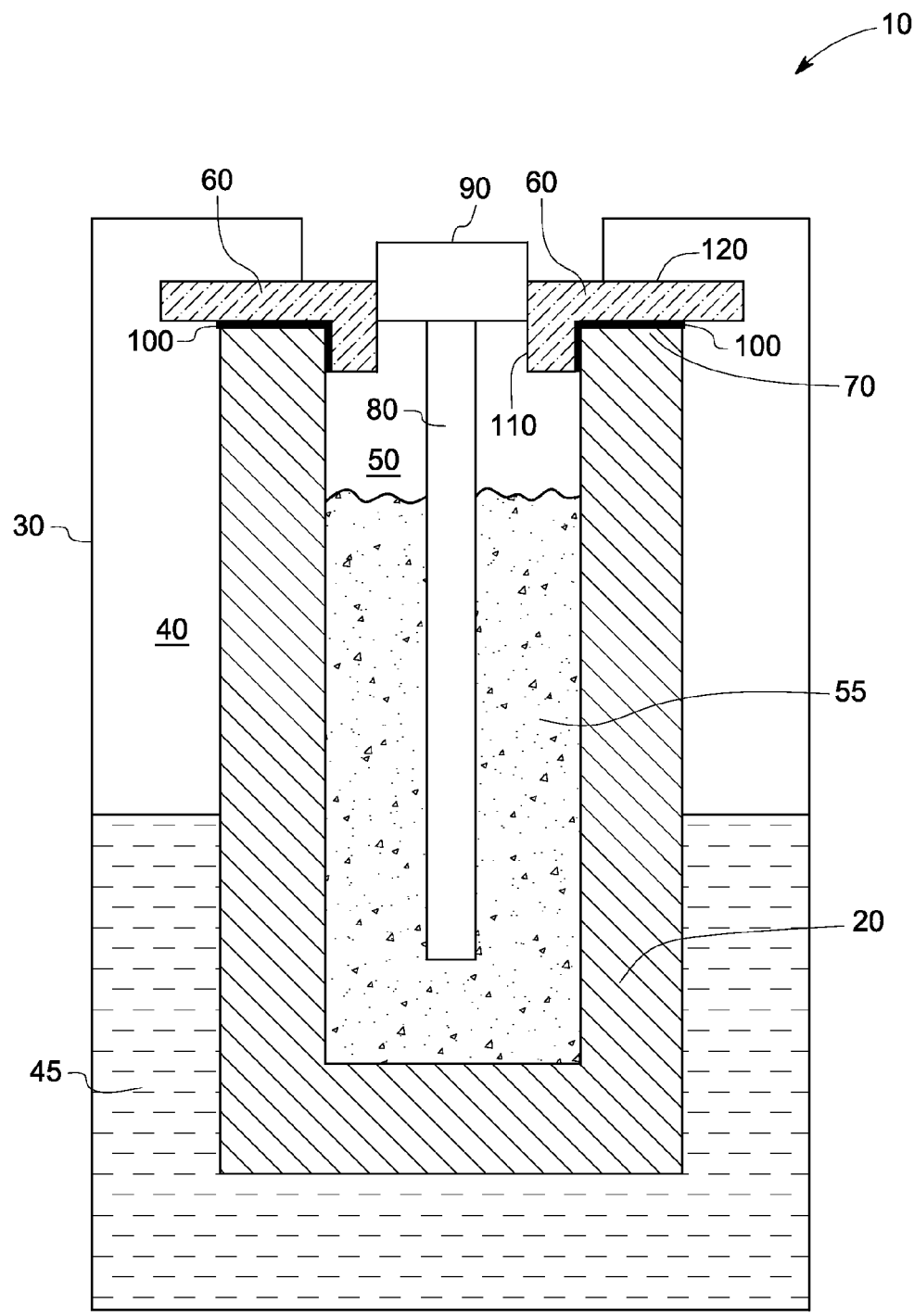
FIG. 2 is a schematic diagram depicting an electrochemical cell, according to another embodiment.

The ceramic collar 60 can fit onto the top end 70 of the separator tube 20, and is sealed with the sealing glass composition. In one embodiment, the collar 60 is positioned around and adjacent to the top end 70 of the separator tube 20 (FIG. 1). In another embodiment, the collar 60 has a lower inner portion 110 that abuts against an inner wall of the tube 20, as illustrated in FIG. 2. The collar can include an upper portion 120 that is recessed. The glass seal 100 is provided in an inverted "L" shape, to seal the tube 20 with the collar 60, at the lower portion 110 and the upper portion 120. The collar 60 and the separator tube 20 may be temporarily held together with an assembly (e.g., a clamp), until it is sealed.

The sealing glass composition may be applied between the collar and the separator tube to seal the ceramic components together. In one embodiment, the sealing glass, in the form of particles or a slurry, is applied in the recess or gap between the surfaces of the separator tube and the adjacent collar. The sealing glass is heated to an elevated temperature, at which the glass melts and wets the two components. The heating can be undertaken in air or in a controlled atmosphere, such as oxygen or nitrogen. The assembly is then cooled to room temperature, with a resulting glass seal between the tube and the collar.

In accordance with some embodiments, an energy storage device includes a plurality of the electrochemical cells as disclosed in previous embodiments. The cells are, directly or indirectly, in thermal and/or electrical communication with each other. Those of ordinary skill in the art are familiar with the general principles of such devices.

EXAMPLES

The examples that follow are merely illustrative, and should not be construed to be any sort of limitation on the scope of the claimed invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

3 sealing glass compositions (samples 1-3) were prepared by mixing aluminum oxide (99.99% Inframat), boron oxide (99%, Sigma-Aldrich), barium oxide (97%, Sigma-Aldrich), and zirconium oxide (99%, Sigma-Aldrich) in the amounts shown in Table 1. The oxide ingredients were mixed thoroughly, by ball milling. The ball-milled mixture was placed in a platinum crucible and melted in a glass-melting furnace at a temperature of about 1650 degrees Celsius for about 10 minutes in an air atmosphere to provide molten glass. The molten glass was quenched between two stainless steel plates in air at room temperature, to form a mass. The quenched glass mass was annealed below its glass transition temperature for about 10 hours, and then formed into a glass frit by crushing the glass mass. The glass frit was then applied to a gap between two ceramic parts to be joined, and heated up to about 1000 degrees Celsius, to form a glass seal.

TABLE 1

| Sample | $B_2O_3$ wt % | $Al_2O_3$ wt % | BaO wt % | $ZrO_2$ wt % |
| --- | --- | --- | --- | --- |
| Sample 1 | 41.05 | 21.47 | 32.29 | 5.19 |
| Sample 2 | 39.14 | 21.13 | 31.93 | 7.7 |
| Sample 3 | 36 | 27 | 24 | 13 |

Example 2

Comparative Example

A comparative sample was prepared by mixing 46 wt % of silicon dioxide, 25 wt % of boron oxide, 10 wt % of alumina, 4 wt % of sodium oxide, 3 wt % of calcium oxide, 6 wt % of barium oxide, and 6 wt % of strontium oxide, using a process similar to that described above for example 1.

Glass transition temperatures of samples 1-3 and the comparative sample were measured using DTA/TGA Seysys 16/18 (France). The amorphous nature of the glass samples was confirmed using X-ray diffraction (CuKa; PANalytical, Netherlands). Coefficient of thermal expansion measurements were carried out for each glass sample, using a dilatometer (DIL 402C, Netzsch, Germany) between room temperature and 600° C. Sapphire is used as the calibration standard. The results are shown in Table 2. Density was calculated from SciGlass© software for each sample, and is also shown in Table 2.

Working temperatures were determined by sealing alpha and beta ceramic bodies with the glass seal composition in controlled environments to temperatures for which suitable wetting characteristics and glass seal microstructures were observed (typically in the range $10^4$ Poise in viscosity). Working temperatures are shown in Table 2.

TABLE 2

| Sample | CTE (ppm/° C.)* | Density (g/cm³) | Tg (° C.) | Working temperature (° C.) |
| --- | --- | --- | --- | --- |
| Sample 1 | 7.29 | 2.968 | 614.7 | 960 |
| Sample 2 | 7.29 | 3.036 | 619 | 971 |
| Sample 3 | 6.85 | 3.013 | 605 | 967 |
| Comparative sample | 6.07 | 2.552 | 649 | 1059 |

*CTE is calculated between 275° C. and 600° C.

Sample 3 and comparative sample were tested for sodium resistance in an accelerated corrosion test. Two glass pieces of each sample were loaded inside a capsule with two sodium cubes (99.99%, Sigma-Aldrich). The capsule was designed using Swagelok® parts made of stainless steel, SS316, with VCR® fittings. To ensure a leak proof capsule, a gasket made of stainless steel, SS316L, was used. The capsule was loaded inside a nitrogen-filled glove box (moisture<0.1 ppm and oxygen<0.1 ppm). The capsule was loaded in a furnace and heated up to about 350° C., to melt the sodium pieces. The glass pieces were completely immersed in the molten sodium for about 1 week during testing.

The samples were measured for sodium corrosion, in terms of discoloration. Increased discoloration indicates increased corrosion. It was observed that the comparative sample showed considerable color change (brown color), while sample 3 showed no color change, or minimal color change.

The samples (sample 3 and the comparative sample) were tested for resistance to halide melt at 350° C., for 1 week and 2 weeks. A capsule was designed using Swagelok® parts made of stainless steel, SS304, with compression fitting. An alumina lining was used to contain the halide powder. The composition of the halide melt was $NaAlCl_4$. The capsule was loaded inside a nitrogen-filled glove box (moisture<0.1 ppm and oxygen<0.1 ppm). A piece of the sample was loaded inside the capsule. The glass piece was completely immersed in the molten halide during testing. Table 3 shows the results of the halide test. In general, corrosion for both Sample 3 and the comparative sample (as evidenced by weight loss) was relatively modest. While, in this instance, the corrosion values for Sample 3 did exceed those of the comparative sample, this amount of halide corrosion is still acceptable for many end uses. Furthermore, the amount of halide corrosion can be reduced by various adjustments, e.g., by adding about 10 weight percent to about 30 weight percent alumina to the glass frit of sample 3 for forming the seal. Moreover, the benefits obtained with greater sodium corrosion resistance (as described above) often outweigh any less-than-ideal results, in terms of halide corrosion resistance.

TABLE 3

Halide Corrosion of Sealing Glasses

| Samples | Weight loss (%) at 350° C./1 week | Weight loss (%) at 350° C./2 weeks |
|---|---|---|
| Sample 3 | 0.20% | 0.49% |
| Comparative Sample | 0.10 | 0.20 |

It was clear from the sodium test and the halide test that sample 3 showed substantially no corrosion, or minimum corrosion to sodium. Moreover, halide corrosion levels were judged to be acceptable for many end uses.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sodium battery incorporating a sealing glass composition, comprising:
    boron oxide present in an amount in a range from about 30 weight percent to about 40 weight percent,
    aluminum oxide present in an amount in a range from about 20 weight percent to about 40 weight percent,
    barium oxide present in an amount in a range from about 10 weight percent to about 40 weight percent, and
    zirconium oxide present in an amount in a range from about 13 weight percent to about 20 weight percent,
        wherein the glass composition is substantially free of silicon oxide and titanium oxide.

2. The sodium battery of claim 1, wherein the glass composition provides a glass seal that joins a first component to a second component of the sodium battery.

3. The sodium battery of claim 2, wherein the first component is an ion-conductive separator, and the second component is an electronically insulating collar.

4. The sodium battery of claim 2, wherein the first component comprises beta-alumina, and the second component comprises alpha-alumina.

5. The sodium battery of claim 1, wherein the sealing glass composition further comprises sodium oxide, calcium oxide, strontium oxide, yttrium oxide or a combination thereof.

6. The sodium battery of claim 1, wherein the sealing glass composition has a glass transition temperature ranging from about 500 degrees Celsius to about 700 degrees Celsius.

7. The sodium battery of claim 1, wherein the sealing glass composition has a working temperature in a range of from about 700 degrees Celsius to about 1200 degrees Celsius.

8. The sodium battery of claim 1, in the form of a sodium metal halide battery.

9. A sodium battery incorporating a sealing glass composition, consisting essentially of:
    boron oxide, present in an amount in a range from about 30 weight percent to about 40 weight percent,
    aluminum oxide, present in an amount in a range from about 20 weight percent to about 40 weight percent,
    barium oxide, present in an amount in a range from about 10 weight percent to about 40 weight percent, and
    zirconium oxide, present in an amount in a range from about 13 weight percent to about 20 weight percent.

10. The sodium battery of claim 1, wherein aluminum oxide is present in an amount in a range from about 20 weight percent to about 30 weight percent.

11. The sodium battery of claim 1, wherein barium oxide is present in an amount in a range from about 20 weight percent to about 35 weight percent.

* * * * *